(12) United States Patent
Kobayashi et al.

(10) Patent No.: US 6,447,122 B1
(45) Date of Patent: Sep. 10, 2002

(54) PROJECTION IMAGE DISPLAY DEVICE USING A REFLECTIVE TYPE DISPLAY ELEMENT

(75) Inventors: Yasushi Kobayashi, Itami; Soh Ohzawa, Toyonaka; Ichiro Kasai, Kawachinagano, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/468,405

(22) Filed: Dec. 20, 1999

(30) Foreign Application Priority Data

Dec. 18, 1998 (JP) .......................... 10-360881

(51) Int. Cl.[7] .............................. G03B 21/14
(52) U.S. Cl. ............................ 353/97; 359/629
(58) Field of Search .................... 353/20, 28, 30, 353/97, 98; 359/629, 630, 631, 633, 637, 638

(56) References Cited

U.S. PATENT DOCUMENTS 5,808,800 A * 9/1998 Handschy et al. .......... 359/630
6,023,373 A * 2/2000 Inoguchi et al. ........... 359/633
6,134,051 A * 10/2000 Hayakawa et al. ......... 359/630
6,204,975 B1 * 3/2001 Watters ..................... 359/633
2001/0010598 A1 * 8/2001 Aritake et al. ............. 359/630

FOREIGN PATENT DOCUMENTS

| JP | 07270714 | 10/1995 |
| JP | 08320451 | 12/1996 |
| JP | 8-320451 | 12/1996 |

* cited by examiner

Primary Examiner—William C. Dowling
(74) Attorney, Agent, or Firm—Burns, Doane, Swecker & Mathis, LLP (57) ABSTRACT

A compact, high resolution projection imaged display device using a reflective-type display element which uniformly illuminates the entirety of the display element without reducing illumination efficiency and ensures viewing conditions of excellent and uniform brightness extending to the fringe of the field of view is provided by an illumination optical system for redirecting illumination light from an illumination light source onto a reflective-type display element. The reflective-type display element reflects light into the viewing optical system wherein the illumination optical system is constructed so as to have an approximate conjugate relationship between the pupil of the user and the illumination light from the illumination light source.

18 Claims, 6 Drawing Sheets

PROJECTION IMAGE DISPLAY DEVICE USING A REFLECTIVE TYPE DISPLAY ELEMENT

Priority is claimed to Japanese Application No. 10-360881, filed Dec. 18, 1998, herein incorporated by reference.

BACKGROUND OF THE INVENTION

1. Field of the Invention

The present invention relates to a projection image display device for displaying a projection image on the pupil of an observer using a reflective type display element, and particularly relates to displays suitable for head-wearable type projection image display devices, i.e., so-called head-mounted displays, which require a high resolution projection image display in a compact form.

2. Description of the Related Art

Projection image display devices, which are worn on the head of an observer, project a virtual image of an image generated by a projection image forming member using a viewing optical system and direct the virtual image to the pupil of the observer. Generally, known projection image display devices are conventionally referred to as head-mounted displays (HMD). The liquid crystals used for the projection image forming member may be broadly divided into transmission-type liquid crystals illuminated from the opposite side from the display side, and reflective-type liquid crystals illuminated from the display side.

The transmission-type liquid crystal display panel widely used in projection image display devices, requires a high transmittance member such as glass or the like as a substrate to transmit illumination light from the back side. High density pixel integration is difficult due to the substantial limitations of the semiconductor manufacturing process used to make these devices. Furthermore, a peripheral circuit area of a certain size such as a Thin Film Transistor (TFT) is required to drive each pixel, and since the integration of the pixels must occur on the same display panel, the pixel area of the whole display panel, i.e., aperture efficiency, is reduced so as to result in disadvantageous reduction of illumination efficiency and image quality.

On the other hand, the reflective-type liquid crystal display panel uses a semiconductor such as silicon as a substrate to provide a compact and high integration display, and since the circuit area can be arranged on the opposite side relative to the display side there is only slight reduction in aperture efficiency even when the integration is increased, so as to provide very high reflectivity to produce a bright image. Since the size of the pixels is very small, using the same number of pixels the size of the display panel can be reduced without decreasing brightness. In a similar size panel the number of pixels can be increased to increase the resolution. Furthermore, the display switching speed is improved since it is theoretically possible to reduce the thickness of the liquid crystal layer for polarization conversion.

Figure 9:
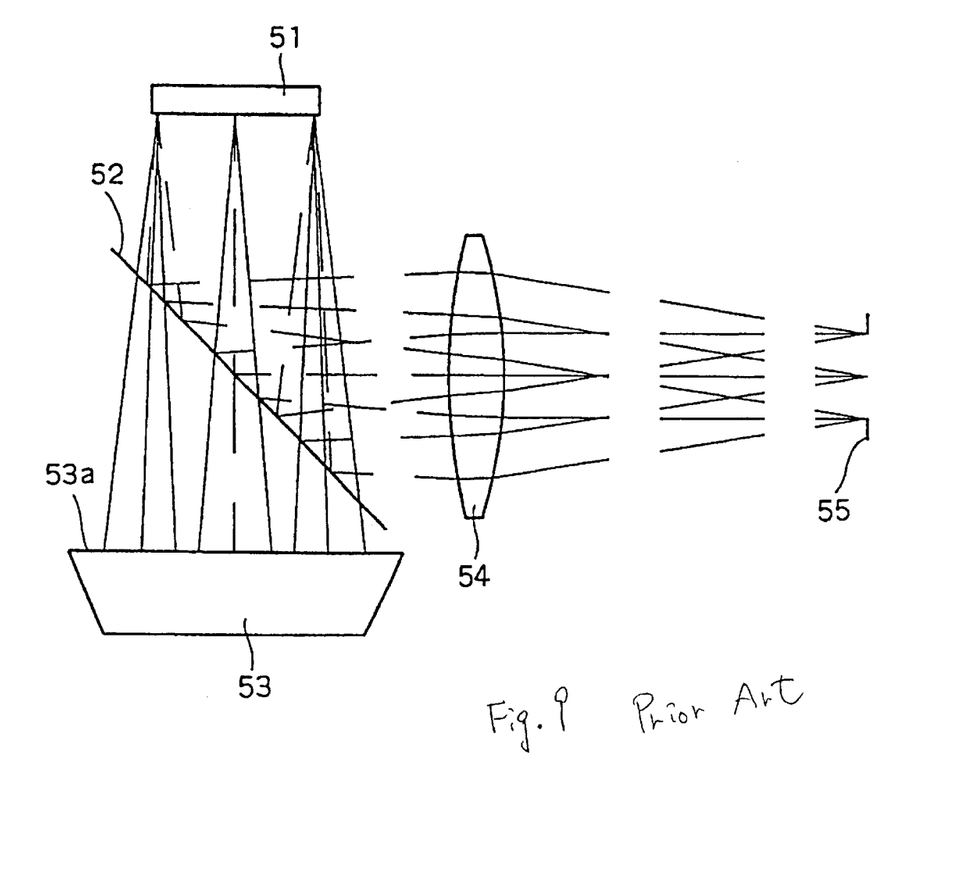
FIG. 9 shows a conventional example of a projection image display device using a reflective type liquid crystal display panel.

If a reflective-type liquid crystal display panel having these many advantages is used in a head-mounted display, a bright high-resolution image can be largely attained in a head-mounted display. FIG. 9 schematically shows the construction of a conventional projection image display device using such a reflective-type liquid crystal display panel. A reflective-type liquid crystal display panel 51 is used as a projection image display element, and a polarization beam splitter (PBS) 52 separates the viewing light reflected by the reflective type liquid crystal display panel 51 and the illumination light from the illumination light source 53, and the viewing optical system eyepiece lens 54 directs the light to the pupil of the user 55, which sees an enlarged projection image.

Figure 8:
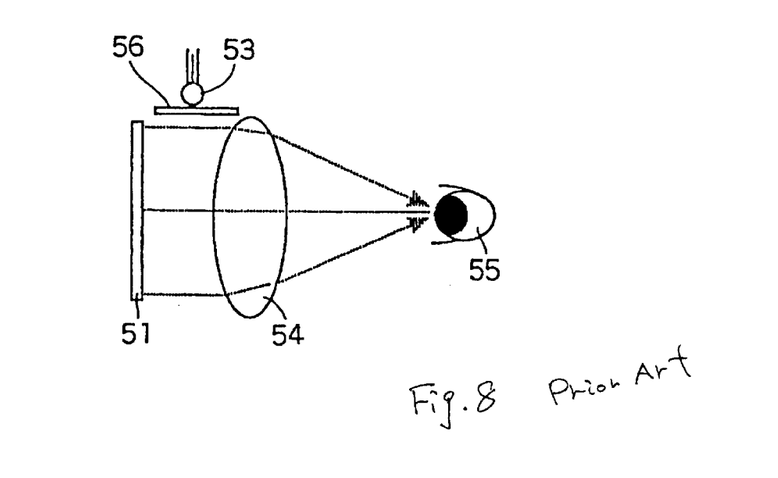
FIG. 8 shows a conventional example of a projection image display device using a reflective type liquid crystal display panel.

FIG. 8 schematically shows the illumination light source 53 disposed near the reflective type liquid crystal display panel 51 and a diffusion panel 56 arranged on the front surface of the illumination light source 53 to diffuse the illumination light from the light source entering the reflective type liquid crystal display panel 51, and the reflected viewing light is directed by the eyepiece lens 54 to the pupil 55, which sees an enlarged projection image.

When using the reflective type liquid crystal display panel, the illumination light must illuminate from the display side of the panel, and the light source must be arranged so as to avoid interfering with image viewing, thereby making it difficult to achieve uniform illumination of the entire surface of the display panel. The construction shown in FIG. 9 does not have an illumination optical system possessing optical power, only the illumination light and the viewing light are separated, there is no conjugate relationship between the illumination surface 53a and the pupil 55, and a large illumination surface is required. When the size of the illumination light source 53 is reduced under such conditions, the light flux on the fringes of the field of view is diminished such that the field of view has a dark fringe.

The construction shown in FIG. 8 provides a diffusion panel on the front surface of the light source to improve the uniformity of the illumination on the display panel, but the result of adequately diffusing the illumination light from the light source is a reduction in illumination efficiency.

In view of the previously described disadvantages, an object of the present invention is to provide a compact and high resolution projection image display device using a reflective-type display element which uniformly illuminates the entirety of the display element without reducing illumination efficiency, and ensures viewing conditions of excellent and uniform brightness to the fringe of the field of view.

BRIEF DESCRIPTION OF THE DRAWINGS

The present invention will now be described by way of exemplary embodiments to which it is not limited and with reference to the accompanying drawings, in which.

DETAILED DESCRIPTION OF THE PREFERRED EMBODIMENTS

The embodiments of the present invention are described hereinafter with reference to the accompanying drawings. FIGS. 1~7 schematically show the construction of the optical systems of the first through seventh embodiments.

Figure 1:
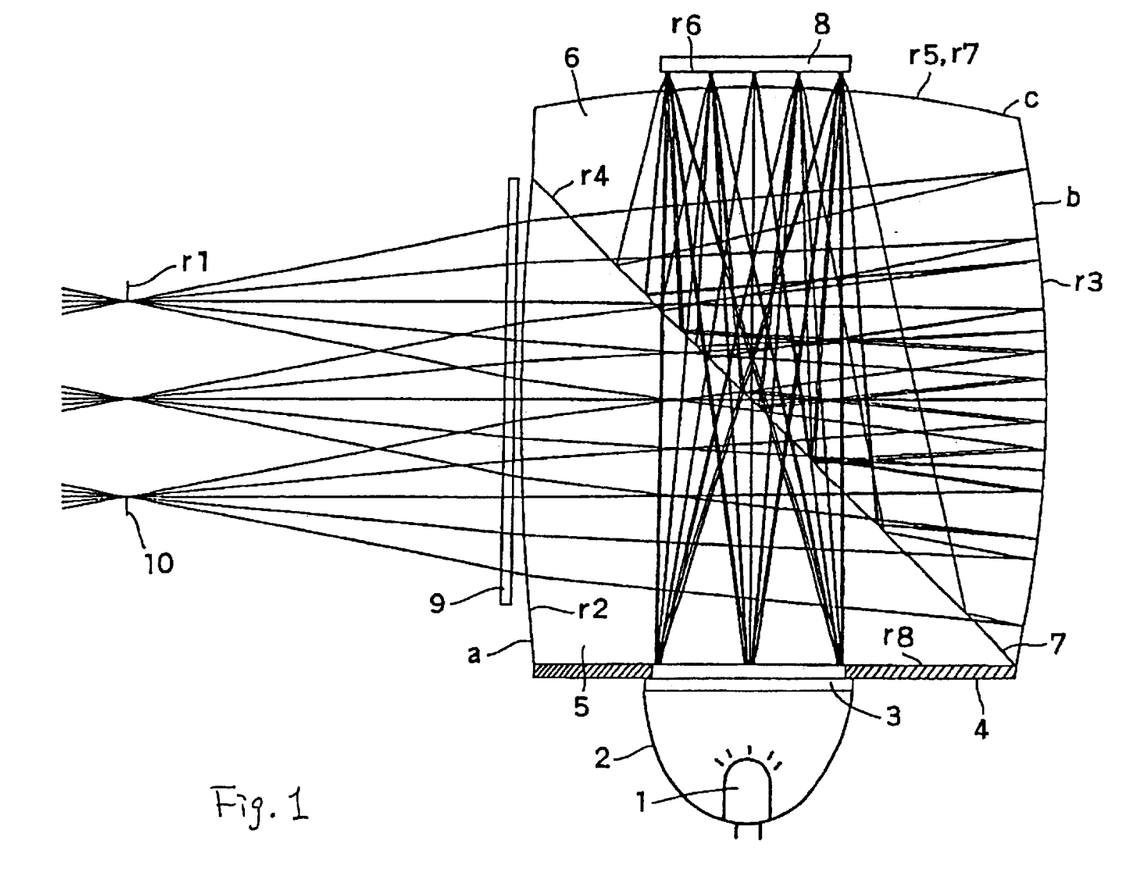
FIG. 1 schematically shows the construction of an optical system of a first embodiment.

In FIG. 1, the reference number 1 refers to an illumination light source, reference number 2 refers to a reflector opening upward in the drawing and surrounding the illumination light source 1, reference number 3 refers to a first polarization plate provided on one end of the reflector, reference number 4 refers to a stop provided on the top surface of the polarization plate. The top of the stop 4 is provided on the bottom surface of a first prism block 5. The prism block 5 is cemented to a second prism block 6 disposed thereabove, such that the cemented section forms an inclined surface from top left to bottom right in the drawing, which functions as a semitransmitting surface 7. On the top side of the prism block 6 is arranged a reflective type liquid crystal display panel 8, and on the left side of the prism block 5 is provided a second polarization plate 9. A pupil 10 of a user is arranged to the left of the polarization plate 9.

In the drawing, the light flux reflected by the reflector 2 and the light flux emitted from the illumination light source 1 are transmitted through the first polarization plate 3, stop 4, prism block 5, and semitransmitting surface 7, and through the prism block 6 so as to enter the reflection-type liquid crystal display panel 8. The light flux modulated as an image is reflected downward toward the illumination light source 1, enters the semitransmitting surface 7, and is reflected to the right as shown in FIG. 1. The reflected light flux impinges the concave reflective surface of surface b forming the viewing optical system, and is again transmitted through the semitransmitting surface 7, passes through the second polarization plate 9, and is directed toward the pupil 10.

In the present embodiment, the viewing optical system and the illumination optical system comprise the two prism blocks 5 and 6 which form the semitransmitting surface 7 therebetween. The viewing optical system comprises the surfaces a, b, and c in the drawing, and the illumination optical system comprises the surface c. The separation of the light flux illuminating the reflective-type liquid crystal display panel 8 and the light flux reflected by the reflective-type liquid crystal display panel 8 is accomplished by the semitransmitting surface 7. In the present embodiment, the illumination light source 1 is arranged at an approximate conjugate position relative to the pupil 10 and the illumination light source 1 (surface c). In this way the size of the illumination light source 1 can be reduced. The reference symbols of surfaces marked a, b, and c are affixed separately to the surface numbers in the construction data which follow. This convention is followed in the subsequent description of further embodiments.

The size of the pupil 10 can be restricted such that only light flux ensuring excellent viewing conditions from a design standpoint is directed to the pupil 10. This restriction can be provided by arranging the stop 4 to cut the excess light flux at an approximate conjugate location relative to the pupil 10, as in the present embodiment. In this embodiment, a polarization plate 3 is disposed medially to the illumination light source 1 and the semitransmitting surface 7, and the second polarization plate 9 is disposed medially to the semitransmitting surface 7 and the pupil 10. This arrangement cuts the ghost light generated by the reflection on the pupil 10 side by preventing transmission of the light flux emitted from the illumination light source 1 through the semitransmitting surface 7.

For example, if the first polarization plate 3 is arranged so as to transmit only polarized light in a certain direction, and the second polarization plate 9 is arranged so as to transmit the polarized light rotated at a 90° polarization direction from the polarized light transmitted by the first polarization plate 3, ghost light is cut by the second polarization plate 9 cannot enter the pupil 10. Since the polarization direction of the light flux modulated by the reflective-type liquid crystal display panel 8 is rotate at 90°, this light flux is transmitted through the second polarization panel 9 after passing through the viewing optical system, and reaches the pupil 10.

Figure 2:
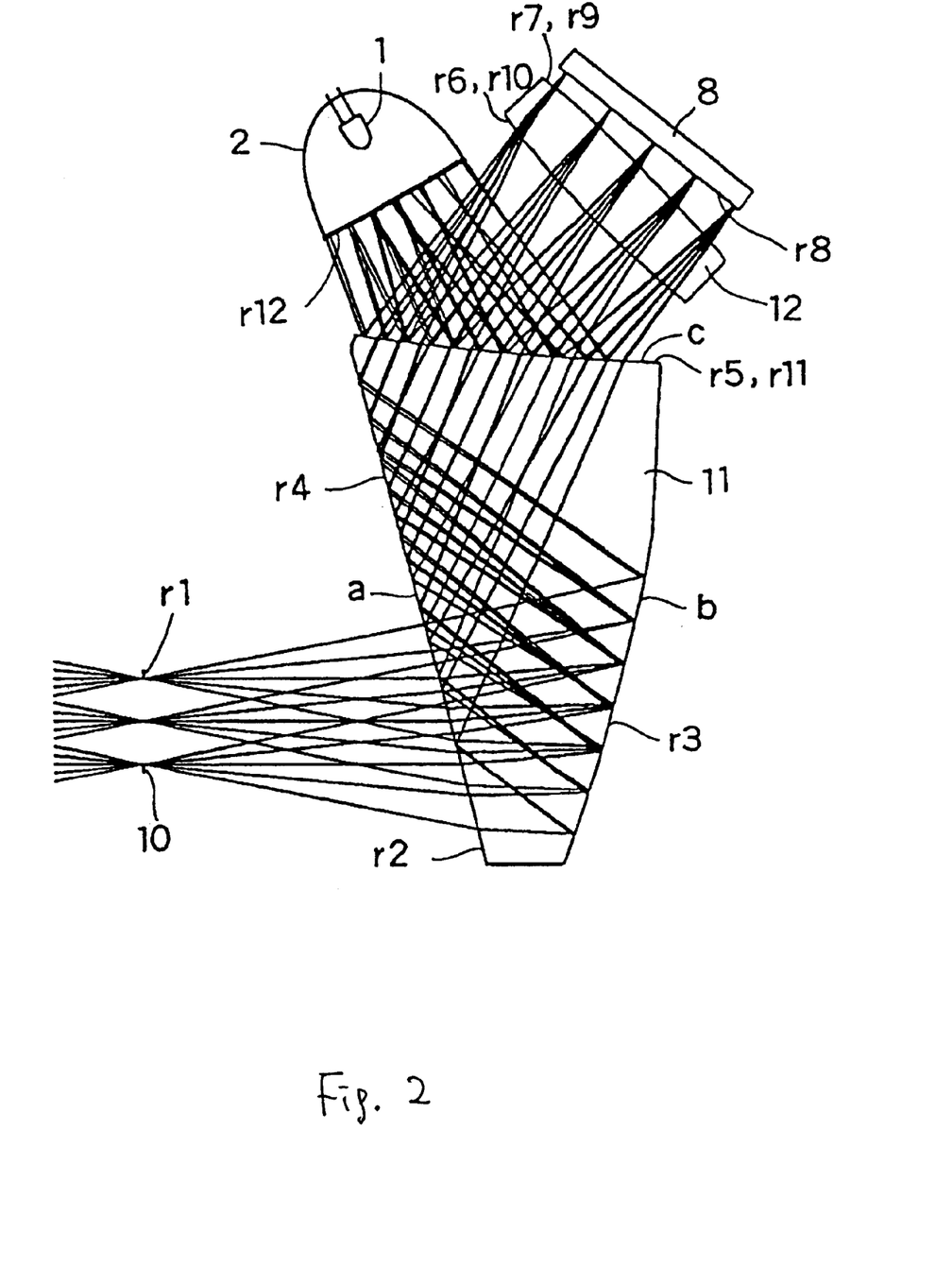
FIG. 2 schematically shows the construction of an optical system of a second embodiment.

FIG. 2 shows an application of the present invention wherein the viewing optical system is in the form of a nonaxis optical system and is presented as a second embodiment. In the drawing, reference number 1 refers to an illumination light source, reference number 2 refers to a reflector opening downward with a inclination toward the right side of the figure around the illumination light source, and reference number 11 refers to a prism block forming the viewing optical system arranged at a right inclination below the reflector. The top surface of the prism block 11 forms surface c which functions as a semitransmitting surface, and at a right inclination thereabove are arranged a condenser lens 12 and a reflection-type liquid crystal display panel 8. A pupil 10 is arranged below and leftward of the prism block 11.

In the drawing, the light flux emitted from the illumination light source 1 and the light flux reflected by the reflector 2 are reflected by the surface c of the prism block 11, pass through the condenser lens 12, and impinge the reflective type liquid crystal display panel 8. The light flux modulated as an image is reflected downward in a leftward inclination to the prism block 11, passes through the condenser lens 12 and impinges the prism block 11 via the surface c. The incident light flux is totally reflected by the surface a of the prism block 11, and arrives at the surface b on the right side. The surface b is a concave reflective surface, and the arriving light flux is reflected at a different angle than at the time of incidence, so as to be directed through the surface a to arrive at the pupil 10. The positional relationship of the surfaces a and b are set so that the surface a is a selectively reflective surface to transmit and reflect via total reflection.

In the present embodiment the surface c, which is the semitransmission surface of the prism block 11 forming the viewing optical system, is used as a reflective surface, which together with the condenser lens 12 forms the illumination optical system, and is positioned in approximate conjugate relationship with the pupil 10 and the illumination light source 1. In this way the size of the illumination light source can be reduced. The surface c participates as a transmission surface in aberration correction by the viewing optical system, and participates as a reflective surface as part of the illumination optical system to reduce the size of the illumination light source. In this way a compact form is effectively achieved by using the surface c as both part of the viewing optical system and as part of the illumination optical system.

Figure 3:
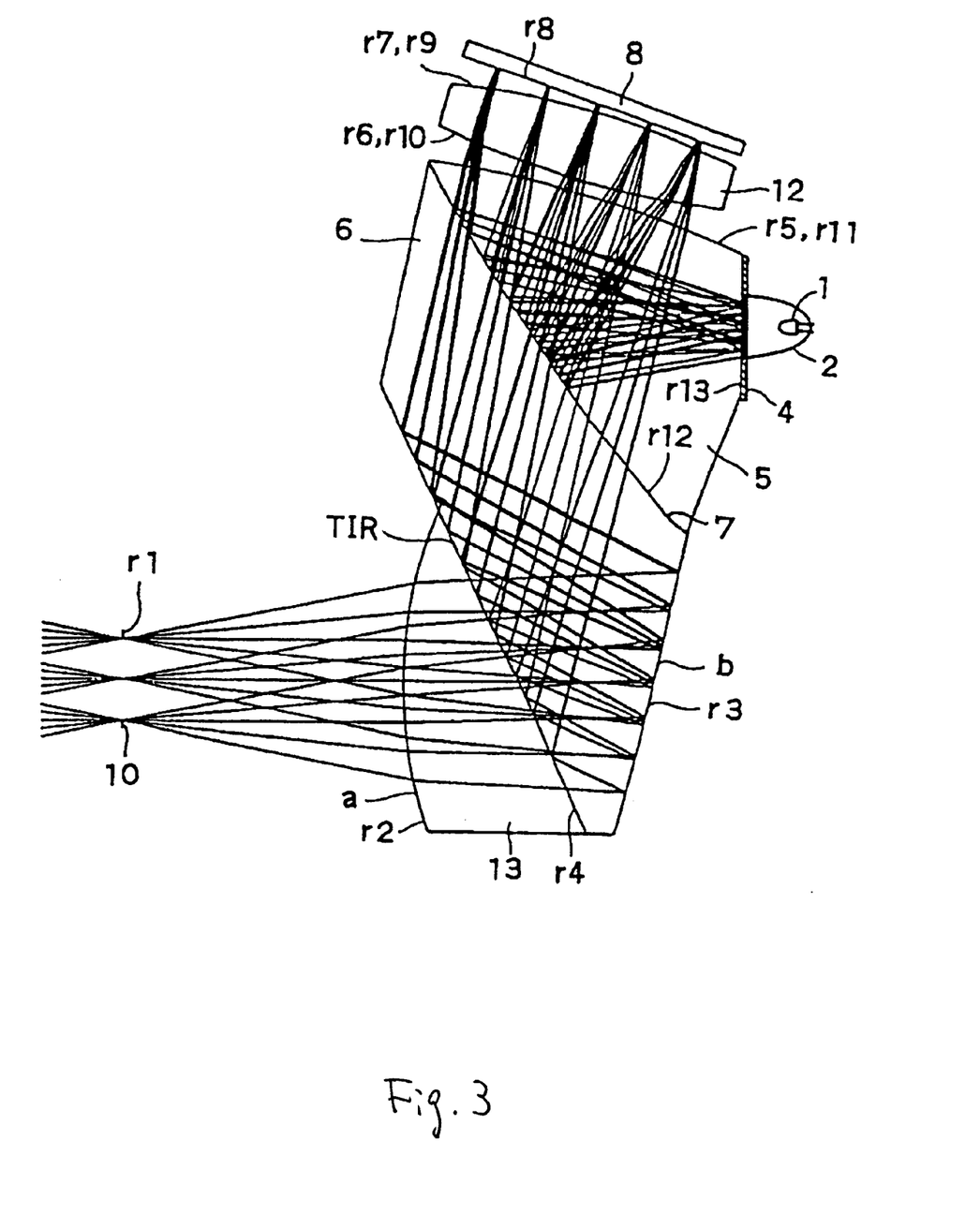
FIG. 3 schematically shows the construction of an optical system of a third embodiment.

FIG. 3 shows an example providing the selectively reflective surface (surface a) of the second embodiment separately as a TIR surface, and the exit surface of the viewing optical system modified independently as surface as in a third embodiment. In the drawing, reference number 1 refers to an illumination light source, reference number 2 refers to a reflector opening to the left around the light source, and reference number 4 refers to a stop provided on the left surface of the reflector. The stop 4 is provided on the right surface of a first prism block 5 to the left side. The first prism block 5 is cemented to a second prism block 6 disposed therebelow, and the cemented section forms an inclined surface from the top left to the bottom right, which functions as a semitransmitting surface 7.

Above the first prism block 5 are arranged a condenser lens 12 and a reflective-type liquid crystal display panel 8. The second prism block 6 is cemented to a third prism block 13 on the left, and the cemented section forms an inclined surface from the top left to the bottom right which functions as a TIR surface. A pupil 10 is disposed on the left of the third prism block 13.

In the drawing, the light flux emitted from the illumination light source 1 and the light flux reflected by the reflector 2 pass through the left stop 4 and the first prism block 5 and are reflected upward by the semitransmitting surface 7, pass through the condenser lens 12 and enter the reflective type liquid crystal display panel 8. The light flux modulated as an image is reflected downward to the first prism block 5 side, passes through the condenser lens 12 and the first prism block 5, and is transmitted through the semitransmitting surface 7. The transmitted light flux is completely reflected by the TIR surface on the bottom left of the second prism block 6, and arrives at the surface b on the right side. The surface b is a concave reflective surface, and the arriving light flux is reflected at a different angle than at the time of incidence, passes through the TIR surface, and is transmitted through the first prism block 13, passes through the surface at the bottom and arrives at the pupil 10.

In this embodiment, the illumination optical system comprises the condenser lens 12 and the semitransmitting surface 7, and is arranged at an approximate conjugate position relative to the illumination light source 1 an the pupil 10, so as to allow a more compact illumination light source 1. Furthermore, the restriction of the design pupil diameter by the placement of a stop at the approximate conjugate plane is identical to that of the second embodiment.

Figure 4:
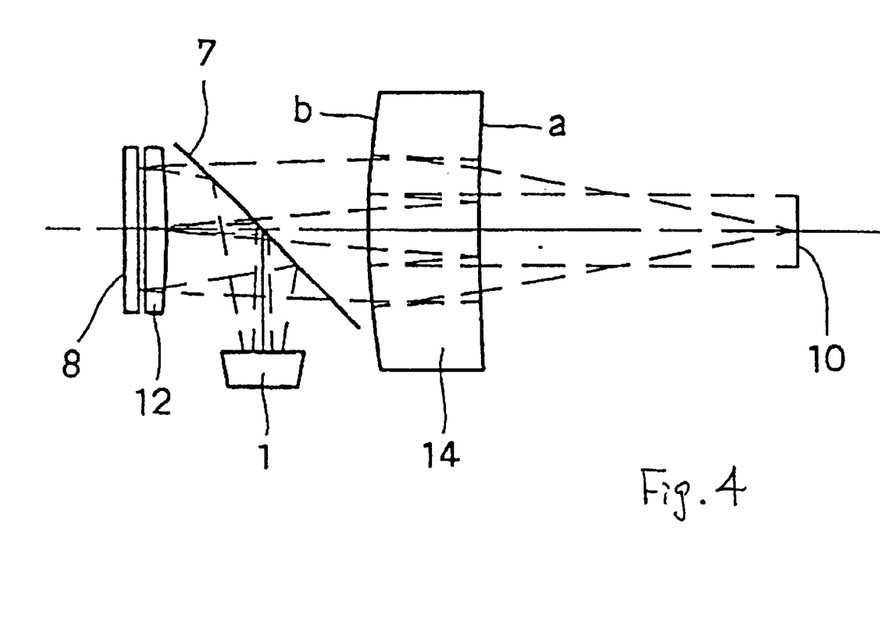
FIG. 4 schematically shows the construction of an optical system of a fourth embodiment.

FIG. 4 shows another construction of the present invention in a fourth embodiment. This embodiment applies the present invention to a so-called pancake type viewing optical system. In the drawing, the light flux emitted upward from the illumination light source 1 is reflected leftward by a semitransmitting surface 7 comprising a half mirror or a PBS or the like, passes through a condenser lens 12 and enters a reflective type liquid crystal display panel 8. The light flux modulated as an image is reflected to the right by the semitransmitting surface 7, passes through the condenser lens 12, and is transmitted through the semitransmitting surface 7.

The transmitted light flux is reflected to the left again to the liquid crystal side (reflective type liquid crystal display panel side) by the surface a which functions as a selectively reflective surface on the pupil side (pupil side described later) of a prism block 14 comprising the viewing optical system, and is reflected to the right again to the pupil 10 by a surface b functioning as a selectively reflective surface on the liquid crystal side of the prism block 14, so as to enter the pupil 10. A cholesteric liquid crystal or the like is used as the material of the aforesaid selectively reflective surfaces. The illumination optical system comprises the condenser lens 12 and the semitransmitting surface 7. In this way the illumination light source 1 and the pupil 10 have an approximate conjugate relationship, and the illumination light source is more compact.

In the following embodiments, so-called Köhler illumination is used. Köhler illumination forms a light source image at the incident pupil position of an object lens not at the observed object via the illumination optical system, and is effective as a method of illuminating an observed object uniformly and with excellent efficiency.

In the following embodiments, Köhler illumination is applied to projection image display devices using a reflective type display element; a light source is arranged at a position approximately symmetrical to a pupil relative to a combiner disposed medially to the pupil of an observer and a viewing optical system, such that the viewing optical system can be used as an illumination optical system to display a projection image by forming a light source image on the pupil of the observer. At this time, the viewing optical system becomes a telecentric optical system relative to the reflective type display element.

Figure 5:
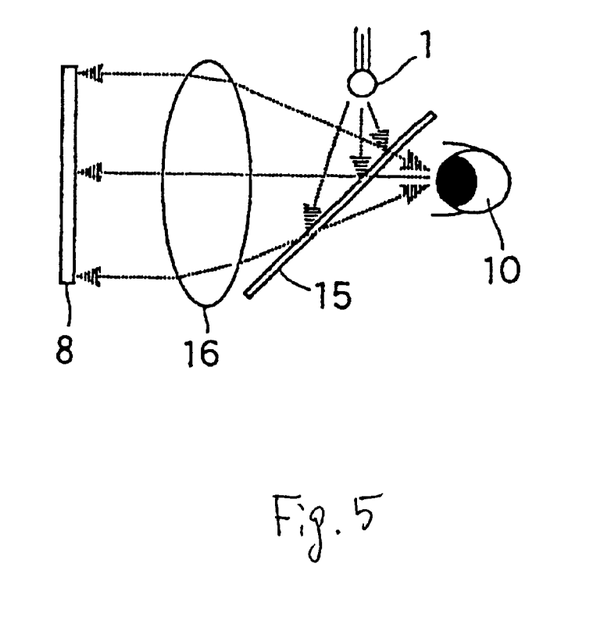
FIG. 5 schematically shows the construction of an optical system of a fifth embodiment.

FIG. 5 shows the construction of an optical system using Köhler illumination in a fifth embodiment. In the drawing, an illumination light source 1 comprised of a light-emitting diode is disposed at a position approximately symmetrical to the pupil 10 of an observer relative to a half mirror 15. This position is near the focus position on the back side of the eyepiece lens 16. The light flux emitted from the illumination light source 1 as indicated by the arrows is reflected by the half mirror 15 and uniformly illuminates the reflective type liquid crystal display panel 8 via the eyepiece lens 16. The light flux reflected by the reflective type liquid crystal display panel 8 is again directed by the eyepiece lens 16 through the half mirror 15 and arrives at the pupil 10. At this time the image of the illumination light source is formed at a position near the pupil 10, realizing Köhler illumination.

In this embodiment, a ferrodielectric reflective type liquid crystal easily driven at high frequency is used as the reflective type liquid crystal display panel, and at least three or more light-emitting diodes corresponding to the three primary colors RGB are used in the illumination light source 1 to sequentially emit light in time division synchronously with the reflective type liquid crystal display panel so as to display a color projection image to an observer. Of course, when the reflective type liquid crystal display panel provided with a color filter is used, the illumination light source may use a white light-emitting diode, white fluorescent light or the like.

Although a half mirror 15 is used as a combiner in this embodiment, it is to be noted that a PBS (polarized light beam splitter) or the like may be used as a combiner. When the light emitted from the illumination light source 1 is excessive in intensity, or when the size of the illumination light source is inadequate relative to the pupil 10, providing a diffusion plate providing a certain degree of diffusion of the illumination light flux medially to the illumination light source and the combiner clearly does not depart from the principle application of the present invention.

Figure 6:
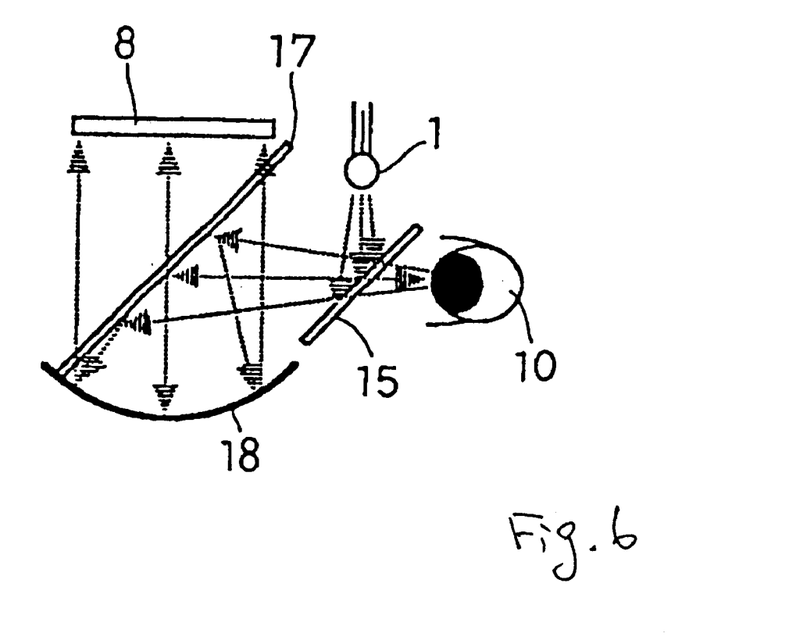
FIG. 6 schematically shows the construction of an optical system of a sixth embodiment.

FIG. 6 shows another construction of an optical system using Köhler illumination in a sixth embodiment. This embodiment uses a concave mirror as the viewing optical system. In the drawing, an illumination light source 1 comprising a light-emitting diode is disposed at a position approximately symmetrical to a pupil 10 of the observer relative to a first half mirror 15. This position is near the focus position on the back side of a concave mirror 18.

The light flux emitted from the illumination light source 1 indicated by the arrows is reflected by the first half mirror 15, then reflected by a second half mirror 17, transmitted through the second half mirror 17 via the concave mirror 18 and thereafter uniformly illuminates the reflective type liquid crystal display panel 8. The light flux reflected by the reflective type liquid crystal display panel 8 again passes through the second half mirror 17 and is directed to the concave mirror 18, then is reflected by the second half mirror 17 after which it passes through the first half mirror 15 and arrives at the pupil 10. At this time the image of the illumination light source 1 is formed near the position of the pupil 10, thereby realizing Köhler illumination.

Figure 7:
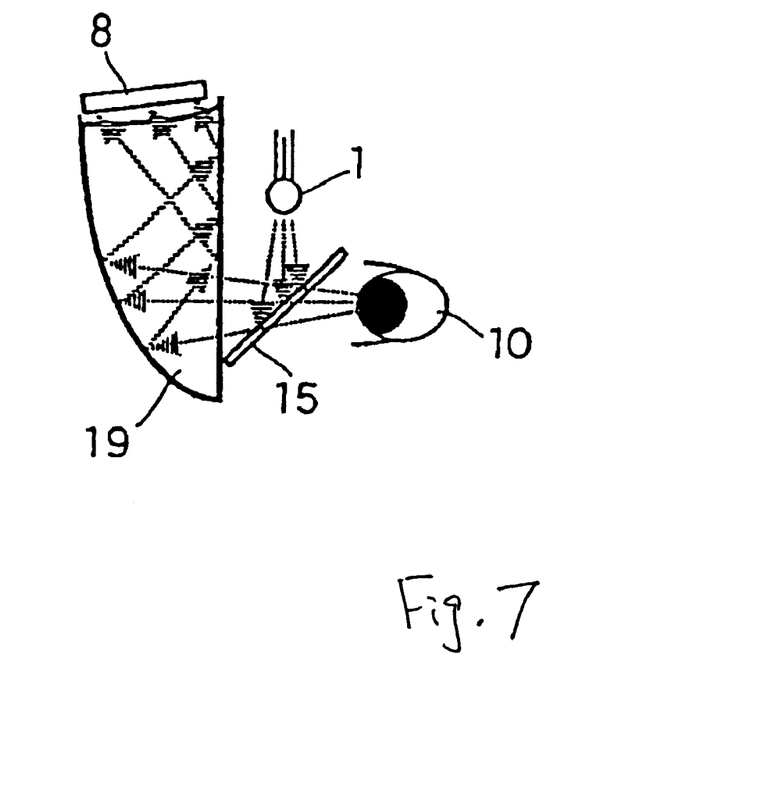
FIG. 7 schematically shows the construction of an optical system of a seventh embodiment.

FIG. 7 shows another construction of an optical system using Köhler illumination in a seventh embodiment. This embodiment uses a free curvature prism as a viewing optical system. In the drawing, an illumination light source 1 comprised of a light-emitting diode is disposed at a position approximately symmetrical with a pupil 10 of the observer relative to a half mirror 15. This position is near the focus position on the back side of a free curvature prism 19.

The light flux emitted from the illumination light source 1 indicated by the arrows is reflected by the half mirror 15, an uniformly illuminates the reflective type liquid crystal display panel 8 via the free curvature prism 19. The light flux reflected by the reflective type liquid crystal display panel 8 is again directed by the free curvature prism 19, passes through the half mirror 15 and arrives at the pupil 10. At this time the image of the illumination light source 1 is formed near the position of the pupil 10, thereby realizing Köhler illumination.

The construction of the projection image display devices of the various embodiments is shown below by way of specific examples of construction data. The first through third examples below respectively correspond to the first through third embodiments described above. In each example, ri (i=1,2,3 . . . ) represents the radius of curvature of the No. i surface counting from the pupil side. In each example, surfaces having an asterisk mark (*) appended to the radius of curvature are constructed as rotationally symmetric aspherical surfaces or anamorphic aspherical surfaces, with the equation of the shape of the aspherical surface being defined below.

[Equation representing the shape of the rotationally symmetrical aspherical surface]

$$Z=ch^2/[1+\ddot{O}1-(1+k)c^3h^2\}]+Ah^4+Bh^6+Ch^8+Dh^{10}+Eh^{12}+Fh^{14}+Gh^{16}+Hh^{18}+Jh^{20}$$

Where Z represents the sagitta of the surface parallel to the Z axis, c represents the curvature (CUY) of the apex of the surface, k represents the conical coefficient, A, B, C, D, E, F, G, H, J respectively represent the transformation coefficients of the fourth, sixth, eighth, tenth, twelfth, fourteenth, sixteenth, eighteenth, and twentieth orders, and $h^2=X^2+Y^2$.

[Equation representing the anamorphic aspherical surface]

$$Z=(CUX.X2+CUY.Y2)/[1+\ddot{O}\{1-(1+KX)CUX^2 \times X^2-(1+KY)CUY^2 \times Y^2\}]$$

$$+AR\{1-AP)X^2+(1+AP)Y^2\}^2+BR\{1-BP)X^2+(1+BP)Y^2\}^3$$

$$+CR\{1-CP)X^2+(1+CP)Y^2\}^4+DR\{1-DP)X^2+(1+DP)Y^2\}^6$$

Where Z represents the sagitta of the surface parallel to the Z axis, CUX and CUY respectively represent the curvature of X and Y, KX and KY respectively represent the conical coefficient of X and Y, AR, BR, CR, DR respectively the rotational symmetry component of the fourth, sixth, eighth, and tenth order transformation coefficient from conical, and AP, BP, CP, DP represent the nonrotational symmetry component of the fourth, sixth, eighth, and tenth order transfor-mation coefficient from conical. The reciprocals of CUX and CUY are the radii of curvature of X and Y, respectively, and are represented by RDX and RDY. Data are shown in each example.

EXAMPLE 1

| Radius of curvature RDY | Medium | | Comment |
|---|---|---|---|
| r1 = ∞ | AIR | | Pupil 10 |
| r2* = 80.87347 | Refractive index 1.4914 | Abbe No. 57.82 | Prism exit surface (surface a) |
| r3* = −41.74305 | Refractive index 1.4914 | Abbe No. 57.82 | Concave reflective surface (surface b) |
| r4 = ∞ | Refractive index 1.4914 | Abbe No. 57.82 | Semitransmission surface 7 |
| r5 = −35.00000 | AIR | | Prism entrance surface (surface c) |
| r6 = ∞ | AIR | | Liquid crystal display surface |
| r7 = −35.00000 | Refractive index 1.4914 | Abbe No. 57.82 | Condenser surface (surface c, fifth surface) |
| r8 = ∞ | | | illumination surface |

[Rotational symmetry aspherical surface coefficient of second surface (r2)]

K: 0.000000
A: $0.388162 \times 10^{-5}$   B: $0.152030 \times 10^{-6}$   c: $-0.252251 \times 10^{-8}$
D: 0.000000

(Disposition data of each surface (first surface reference))

| Surface No. | XSC | YSC | ZSC | ASC | BSC | CSC |
|---|---|---|---|---|---|---|
| 1 | 0.00000 | 0.00000 | 0.00000 | 0.00000 | 0.00000 | 0.00000 |
| 2 | 0.00000 | 0.00000 | 12.00000 | 0.00000 | 0.00000 | 0.00000 |
| 3 | 0.00000 | 0.00000 | 28.00000 | 0.00000 | 0.00000 | 0.00000 |
| 4 | 0.00000 | 0.00000 | 19.00000 | 45.0000 | 0.00000 | 0.00000 |
| 5 | 0.00000 | 9.50000 | 19.00000 | 90.0000 | 0.00000 | 0.00000 |
| 6 | 0.00000 | 9.92814 | 19.00000 | 90.0000 | 0.00000 | 0.00000 |
| 7 | 0.00000 | 9.50000 | 19.00000 | 90.0000 | 0.00000 | 0.00000 |
| 8 | 0.00000 | −8.50000 | 19.00000 | 90.0000 | 0.00000 | 0.00000 |

In regard to the disposition data of each surface, when viewing the image side from the object side (i.e., the +Z direction), the Y axis is positive in the upward direction, and the X axis is positive in the leftward direction; X, Y, Z represent the position of the various surfaces using the first surface as a reference; and A, B, C represent the inclination. This scheme is identical in the examples that follow. In the present example, the viewing optical system comprises the first through fifth surfaces, and the illumination optical system comprises the seventh and eighth surfaces.

EXAMPLE 2

| Radius of curvature RDY | Medium | | Comment |
|---|---|---|---|
| r1 = ∞ | AIR | | Pupil 10 |
| r2* = 11056.40405 | Refractive index 1.4914 | Abbe No. 57.82 | Prism exit surface (surface a) |
| r3* = −66.18426 | Refractive index 1.4914 | Abbe No. 57.82 | Concave reflective surface (surface b) |

-continued

| | | | |
|---|---|---|---|
| r4* = 11056.40405 | Refractive index 1.4914 | Abbe No. 57.82 | Total reflective surface (surface a, second surface) |
| r5* = 99.98674 | AIR | | Prism entrance surface (surface c) |
| r6 = 40.00000 | Refractive index 1.4914 | Abbe No. 57.82 | Condenser lens 12 |
| r7 = −40.00000 | AIR | | |
| r8 = ∞ | AIR | | Liquid crystal display surface |
| r9 = 40.00000 | Refractive index 1.4914 | Abbe No. 57.82 | Condenser lens 12 (Seventh surface) |
| r10 = 40.00000 | AIR | | (Sixth surface) |
| r11 = 99.98674 | AIR | | Semitransmission surface (surface c, fifth surface) |
| r12 = ∞ | AIR | | Illumination surface |

[Anamorphic aspherical surface coefficient of the second surface (r2) and fourth surface (r4)]

| | | |
|---|---|---|
| KY: 0.000000 | KX: 0.000000 | RDX: −341.84094 |
| AR: −0.486850 × $10^{-5}$ | BR: 0.129060 × $10^{-8}$ | CR: −0.188200 × $10^{-9}$ |
| DR: 0.000000 | | |
| AP: −0.421231 | BP: −0.536746 | CP: −0.473816 |
| DP: 0.000000 | | |

[Anamorphic aspherical surface coefficient of the third surface (R3)]

| | | |
|---|---|---|
| KY: 23.379666 | KX: 22.126557 | RDX: −56.19072 |
| AR: 0.1762623 × $10^{-4}$ | BR: −0.269533 × $10^{-6}$ | CR: 0.490310 × $10^{-8}$ |
| DR: −0.271247 × $10^{-10}$ | | |
| AP: −0.826965 × $10^{-1}$ | BP: −0.930294 × $10^{-2}$ | CP: 0.276424 × $10^{-2}$ |
| DP: 0.196499 × $10^{-1}$ | | |

[Anamorphic aspherical surface coefficient of the fifth surface (r5) and eleventh surface (R11)]

| | | |
|---|---|---|
| KY: 0.000000 | KX: 0.000000 | RDX: 100.00000 |
| AR: −0.172239 × $10^{-6}$ | BR: 0.327672 × $10^{-6}$ | CR: 0.108004 × $10^{-8}$ |
| DR: 0.000000 | | |
| AP: −0.519816 × 10 | BP: 0.253723 × $10^{-1}$ | CP: −0.101008 × 10 |
| DP: 0.000000 | | |

(Disposition data of each surface (first surface reference))

| Surface No. | YSC | XSC | ZSC | ASC | BSC | CSC |
|---|---|---|---|---|---|---|
| 1 | 0.00000 | 0.00000 | 0.00000 | 0.00000 | 0.0000 | 0.0000 |
| 2 | 0.00000 | 3.3398 | 10.00000 | 14.4914 | 0.0000 | 0.0000 |
| 3 | 0.00000 | 0.71726 | 16.78070 | −15.3681 | 0.0000 | 0.0000 |
| 4 | 0.00000 | 3.33988 | 10.0000 | 14.4914 | 0.0000 | 0.0000 |
| 5 | 0.00000 | 13.17979 | 12.78405 | 84.7778 | 0.0000 | 0.0000 |
| 6 | 0.00000 | 17.89054 | 16.16554 | 44.2948 | 0.0000 | 0.0000 |
| 7 | 0.00000 | 19.63642 | 17.95493 | 44.2948 | 0.0000 | 0.0000 |
| 8 | 0.00000 | 20.63546 | 18.30949 | 51.7838 | 0.0000 | 0.0000 |
| 9 | 0.00000 | 19.63642 | 17.95493 | 44.2948 | 0.0000 | 0.0000 |
| 10 | 0.00000 | 17.89054 | 16.16554 | 44.2948 | 0.0000 | 0.0000 |
| 11 | 0.00000 | 13.17979 | 12.78405 | 84.7778 | 0.0000 | 0.0000 |
| 12 | 0.00000 | 21.14658 | 13.51219 | 119.7778 | 0.0000 | 0.0000 |

In this embodiment, the viewing optical system comprises the first surface through the seventh surface, and the illumination optical system comprises the ninth surface through the twelfth surface.

EXAMPLE 3

| Radius of curvature RDY | Medium | | Comment |
|---|---|---|---|
| r1 = ∞ | AIR | | Pupil 10 |
| r2* = 17.53188 | Refractive index 1.4914 | Abbe No. 57.82 | Prism exit surface (surface a) |
| r3* = −141.62325 | Refractive index 1.4914 | Abbe No. 57.82 | Concave reflective surface (surface b) |
| r4 = ∞ | Refractive index 1.4914 | Abbe No. 57.82 | TIR surface |
| r5 = −40.00000 | AIR | | Prism entrance surface |
| r6 = 30.00000 | Refractive index 1.4914 | Abbe No. 57.82 | Condenser lens 12 |
| r7 = −30.00000 | AIR | | |
| r8 = ∞ | AIR | | Liquid crystal display surface |
| r9 = −30.00000 | Refractive index 1.4914 | Abbe No. 57.82 | Condenser lens 12 (Seventh surface) |
| r10 = 30.00000 | AIR | | (Sixth surface) |
| r11 = −40.00000 | Refractive index 1.4914 | Abbe No. 57.82 | (Same as fifth surface) |
| r12 = 70.00000 | Refractive index 1.4914 | Abbe No. 57.82 | Semitransmission surface |
| r13 = ∞ | AIR | | Illumination surface |

[Rotational symmetry aspherical surface coefficient of the second surface (r2)]

| | | |
|---|---|---|
| K: 0.000000 | | |
| A: 0.749182 × $10^{-4}$ | B: −0.104949 × $10^{-5}$ | C: 0.362648 × $10^{-7}$ |
| D: −0.563498 × $10^{-9}$ | E: 0.295641 × $10^{-11}$ | F: 0.000000 |
| G: 0.000000 | H: 0.000000 | |

[Anamorphic aspherical surface coefficient of the third surface (R3)]

| | | |
|---|---|---|
| KY: −0.995099 | KX: 50.749178 | RDX: −126.06681 |
| AR: 0.237363 × $10^{-4}$ | BR: −0.160488 × $10^{-6}$ | CR: 0.648223 × $10^{-8}$ |
| DR: −0.558788 × $10^{-10}$ | | |
| AP: −0.154193 | BP: −0.883619 × $10^{-1}$ | CP: 0.615473 × $10^{-1}$ |
| DP: 0.989218 × $10^{-1}$ | | |

(Disposition data of each surface (first surface reference))

| Surface No. | XSC | YSC | ZSC | ASC | BSC | CSC |
|---|---|---|---|---|---|---|
| 1 | 0.00000 | 0.00000 | 0.00000 | 0.0000 | 0.0000 | 0.0000 |
| 2 | 0.00000 | 0.00000 | 10.00000 | 0.0000 | 0.0000 | 0.0000 |
| 3 | 0.00000 | −0.03948 | 19.00000 | −13.1724 | 0.0000 | 0.0000 |
| 4 | 0.00000 | 1.23666 | 13.54734 | 25.0000 | 0.0000 | 0.0000 |
| 5 | 0.00000 | 17.55782 | 16.17149 | 74.4052 | 0.0000 | 0.0000 |
| 6 | 0.00000 | 17.99361 | 16.29312 | 74.4052 | 0.0000 | 0.0000 |
| 7 | 0.00000 | 20.40157 | 16.96521 | 74.4052 | 0.0000 | 0.0000 |
| 8 | 0.00000 | 20.72216 | 16.93059 | 71.3776 | 0.0000 | 0.0000 |
| 9 | 0.00000 | 20.40157 | 16.96521 | 74.4052 | 0.0000 | 0.0000 |
| 10 | 0.00000 | 17.99361 | 16.29312 | 74.4052 | 0.0000 | 0.0000 |
| 11 | 0.00000 | 17.55782 | 16.17149 | 74.4052 | 0.0000 | 0.0000 |
| 12 | 0.00000 | 12.26029 | 14.69291 | 34.4052 | 0.0000 | 0.0000 |
| 12 | 0.00000 | 17.34566 | 22.11847 | −0.5948 | 0.0000 | 0.0000 |

In this embodiment the viewing optical system comprises the first surface through the seventh surface, and the illumination optical system comprises the ninth surface through the thirteenth surface.

The embodiments described above provide projection image display devices using reflective type display elements which are compact and high resolution, uniformly illuminate the entire display element without reducing illumination efficiency, and ensure excellent viewing conditions with even brightness to the edges of the field of view. Furthermore, the pupil of the observer is restricted to a design area to ensure excellent viewing conditions. These embodiments further attain compactness.

The present invention is not limited to the foregoing exemplary embodiments. Variations and modifications will occur of those skilled in the art which do not depart from the scope of the invention as recited in the following claims.

What is claimed is:

1. A projection image display device comprising:
   a reflective type display element for forming a projection image;
   a viewing optical system for directing light from the reflective type display element to a pupil of a user;
   an illumination light source for illuminating the reflective type display element; and
   an illumination optical system for directing illumination light from the illumination light source onto the reflective type display element to be reflected by the reflective type display element into the viewing optical system, wherein the illumination optical system is constructed so as to have an approximate conjugate relationship between the pupil of the user and the illumination light of the illumination light source.

2. The projection image display device as claimed in claim 1, wherein the illumination optical system has a stop for limiting illumination light flux from the illumination light source.

3. The projection image display device as claimed in claim 1, wherein part of the illumination optical system is also part of the viewing optical system.

4. The projection image display device as claimed in claim 1, further comprising a first polarization plate between said illumination light source and said illumination optical system and a second polarization plate between said viewing optical system and said pupil of said user.

5. The projection image display device as claimed in claim 1, wherein said viewing optical system and said illumination optical system include two prism blocks cemented together such that the cemented section functions as a semitransmitting surface.

6. The projection image display device as claimed in claim 5, wherein said viewing optical system includes a first surface of said two cemented prism blocks closest to said pupil, a second surface of said two cemented prism blocks which reflects light received by said semitransmitting surface, and a third surface of said two cemented prism blocks through which light passes to said reflective type display.

7. The projection image display device as claimed in claim 6, wherein said illumination optical system includes said third surface of said two cemented prism blocks through which light passes to said reflective type display.

8. The projection image display device as claimed in claim 6, wherein said viewing optical system includes a nonaxis optical system.

9. The projection image display device as claimed in claim 8, wherein said viewing optical system includes a prism block a surface of which receives light directly from said illumination light source and functions as a semitransmitting surface.

10. The projection image display device as claimed in claim 6, wherein said illumination optical system further comprises a condenser lens between said prism block and said reflection type display element.

11. The projection image display device as claimed in claim 1, wherein said viewing optical system includes a TIR surface.

12. The projection image display device as claimed in claim 1, wherein said illumination optical system comprises a condenser lens and a semitransmitting surface.

13. The projection image display device as claimed in claim 1, wherein light flux emitted from the illumination light source is reflected by a semitransmitting surface, passes through a condenser lens and enters a reflective type liquid crystal display panel to be modulated and reflected, passes through the condenser lens and through the semitransmitting surface.

14. The projection image display device as claimed in claim 1, wherein said viewing optical system includes a selective reflecting surface using a cholesteric liquid crystal.

15. A projection image display device comprising:
   a reflective type display element for forming a projection image;
   a viewing optical system for directing light from the reflective type display element to a pupil of a user;
   an illumination light source for illuminating the reflective type display element through the viewing optical system; and
   a combiner disposed medially to the viewing optical system and the pupil, wherein the illumination optical system is arranged at a position approximately symmetrical to the pupil relative to the combiner.

16. The projection image display device as claimed in claim 15, wherein the reflective type display element comprises a ferrodielectric reflective type liquid crystal, and the illumination light source comprises at least three or more light-emitting diodes corresponding to the three primary colors RGB,
   wherein a color projection image is displayed by synchronizing projection image signals for driving the reflective type liquid crystal display element to produce sequential emissions from the light-emitting diodes.

17. The projection image display device as claimed in claim 15, wherein a pupil of the viewing optical system and the illumination light source are arranged near the back side focus position of the viewing optical system, such that the viewing optical system becomes a substantially telecentric optical system relative to the reflective type display element.

18. The projection image display device as claimed in claim 16, wherein a pupil of the viewing optical system and the illumination light source are arranged near the back side focus position of the viewing optical system, such that the viewing optical system becomes a substantially telecentric optical system relative to the reflective type display element.

* * * * *